United States Patent
Watts et al.

(10) Patent No.: US 12,077,977 B2
(45) Date of Patent: Sep. 3, 2024

(54) INFLATABLE VEHICLE ACCESSORIES

(71) Applicant: FLATED LLC, San Marcos, CA (US)

(72) Inventors: Daniel Watts, Carlsbad, CA (US); Kenneth Tenhoeve, Gypsum, CO (US); Ryan Guay, Boulder, CO (US)

(73) Assignee: FLATED LLC, San Marcos, CA (US)

( * ) Notice: Subject to any disclaimer, the term of this patent is extended or adjusted under 35 U.S.C. 154(b) by 0 days.

(21) Appl. No.: 18/605,668

(22) Filed: Mar. 14, 2024

(65) Prior Publication Data
US 2024/0218693 A1    Jul. 4, 2024

Related U.S. Application Data

(63) Continuation of application No. 17/481,901, filed on Sep. 22, 2021, now Pat. No. 11,976,487.
(Continued)

(51) Int. Cl.
*E04H 15/06* (2006.01)
*B60J 7/10* (2006.01)
(Continued)

(52) U.S. Cl.
CPC .............. *E04H 15/06* (2013.01); *B60J 7/102* (2013.01); *B60J 7/1256* (2013.01); *B60J 7/141* (2013.01);
(Continued)

(58) Field of Classification Search
CPC .............. E04H 15/20; E04H 2015/202; E04H 2015/205; E04H 2015/206; B60J 7/141; B60J 7/1256; B60J 7/1607; E04B 1/169
(Continued)

(56) References Cited

U.S. PATENT DOCUMENTS 2,698,020 A    12/1954   Phane
2,752,928 A *   7/1956   Barker .................... E04H 15/20
                                            52/2.21
(Continued)

FOREIGN PATENT DOCUMENTS

EP          3760528 A1    1/2021

OTHER PUBLICATIONS

Durainflate, "Drop stitch fabric series for inflatable products", https://www.durainflate.com/product-category/material/drop-stitch-fabric/, accessed Aug. 25, 2021.
(Continued)

*Primary Examiner* — Robert Canfield
(74) *Attorney, Agent, or Firm* — SoCal IP Law Group LLP; Angelo J. Gaz

(57) ABSTRACT

Elements of drop-stitch material are formed into different structures. In a platform, two legs support a horizontal platform. All are of drop-stitch material, which can be inflated to sufficient pressure for it to be rigid. Valves between the legs and platform allow air to flow between the legs and the platform. Another design is a luggage or cargo carrier for vehicles with a base, top and front walls formed of interconnected drop-stitch material. When the drop-stitch material is inflated, the material forms a cavity which receives luggage or other items. Sidewalls create an enclosed space, elements of the drop-stitch material can form other structures such as a truck shell with openings through the material to acts as windows or a door.

19 Claims, 6 Drawing Sheets

Related U.S. Application Data

(60) Provisional application No. 63/137,080, filed on Jan. 13, 2021, provisional application No. 63/081,526, filed on Sep. 22, 2020.

(51) Int. Cl.
| | |
|---|---|
| *B60J 7/12* | (2006.01) |
| *B60J 7/14* | (2006.01) |
| *B60J 7/16* | (2006.01) |
| *B60P 3/32* | (2006.01) |
| *B60P 3/34* | (2006.01) |
| *B60P 3/38* | (2006.01) |
| *E04B 1/16* | (2006.01) |
| *E04H 15/20* | (2006.01) |

(52) U.S. Cl.
CPC .............. *B60J 7/1607* (2013.01); *B60P 3/32* (2013.01); *B60P 3/34* (2013.01); *B60P 3/341* (2013.01); *B60P 3/38* (2013.01); *E04B 1/169* (2013.01); *E04H 15/20* (2013.01); *E04H 2015/202* (2013.01); *E04H 2015/205* (2013.01); *E04H 2015/206* (2013.01)

(58) Field of Classification Search
USPC .......... 135/88.13, 88.15; 52/2.11, 2.17, 2.22, 52/2.25
See application file for complete search history.

(56) References Cited

U.S. PATENT DOCUMENTS

| | | | | |
|---|---|---|---|---|
| 2,819,724 | A * | 1/1958 | Barker | E04H 9/16 52/2.18 |
| 2,895,490 | A * | 7/1959 | Dimond | E04H 15/20 52/2.21 |
| 3,145,719 | A * | 8/1964 | Johnson | E04H 15/20 52/2.21 |
| 3,390,491 | A * | 7/1968 | Hayden | H05K 9/0001 52/2.25 |
| 3,393,479 | A * | 7/1968 | Slotnick | E04H 15/20 52/2.21 |
| 3,402,960 | A * | 9/1968 | Erke | B62D 33/0612 5/118 |
| 3,649,063 | A * | 3/1972 | Stark | B60P 3/32 135/88.13 |
| 3,953,066 | A * | 4/1976 | Hamilton | B60P 3/34 135/88.13 |
| 4,093,302 | A * | 6/1978 | Adams | B60P 3/34 296/100.18 |
| 4,101,062 | A | 7/1978 | Lazar | |
| 4,296,960 | A * | 10/1981 | Winchester | B60P 3/32 135/88.13 |
| 4,335,545 | A * | 6/1982 | Couch | E04H 15/20 52/2.19 |
| 4,486,479 | A * | 12/1984 | F'Geppert | E04H 15/20 52/2.21 |
| 5,566,512 | A * | 10/1996 | Page | E04H 15/22 52/2.16 |
| 5,636,478 | A * | 6/1997 | Chen | E04H 15/324 135/96 |
| 5,692,795 | A * | 12/1997 | Mininger | E04H 15/20 296/159 |
| 5,893,238 | A * | 4/1999 | Peacock | E04H 15/20 135/125 |
| 5,947,354 | A | 9/1999 | Willams | |
| 6,119,408 | A | 9/2000 | Page | |
| 7,131,805 | B1 | 11/2006 | Morris | |
| 7,540,555 | B2 * | 6/2009 | Stabile, Jr. | B60P 3/341 296/159 |
| 8,550,538 | B1 * | 10/2013 | Brandenburg | B60P 3/341 5/118 |
| 8,672,403 | B2 | 3/2014 | Mendis et al. | |
| 10,569,714 | B2 * | 2/2020 | Amoriello | F04D 29/044 |
| 10,758,049 | B2 | 9/2020 | Cooper | |
| 10,857,948 | B2 | 12/2020 | Lim | |
| 11,059,414 | B2 * | 7/2021 | Dorn | E04H 15/06 |
| D935,378 | S * | 11/2021 | Chen | D12/403 |
| 11,352,808 | B2 * | 6/2022 | Chen | E04H 15/20 |
| D1,000,349 | S * | 10/2023 | You | D15/199 |
| 2009/0025302 | A1 * | 1/2009 | Wang | E04H 15/20 52/2.17 |
| 2010/0146868 | A1 * | 6/2010 | Lukasiewicz | E04H 15/20 52/741.1 |
| 2012/0131857 | A1 * | 5/2012 | Ross-da Silva | E04H 15/20 52/2.18 |
| 2013/0000036 | A1 | 1/2013 | Greeny et al. | |
| 2014/0132022 | A1 * | 5/2014 | Espig | B60J 7/1657 296/37.7 |
| 2015/0026878 | A1 | 1/2015 | Rambo | |
| 2016/0286982 | A1 | 10/2016 | Smith | |
| 2017/0313027 | A1 * | 11/2017 | Silvia | B32B 27/40 |
| 2019/0017287 | A1 | 1/2019 | Currid | |
| 2020/0107640 | A1 | 4/2020 | Cooper | |
| 2020/0307118 | A1 | 10/2020 | Hjerpe et al. | |
| 2021/0121757 | A1 | 4/2021 | Cooper et al. | |
| 2022/0212858 | A1 * | 7/2022 | Krajewski | B62D 25/06 |
| 2023/0211563 | A1 * | 7/2023 | Enserink | B29C 65/08 156/308.4 |
| 2023/0313556 | A1 * | 10/2023 | Xu | F21S 9/032 135/88.13 |
| 2023/0323700 | A1 * | 10/2023 | Thelin | E04H 15/20 52/2.11 |

OTHER PUBLICATIONS

Gumotex, "Revolution in the field of Drop-Stitch material coating", https://www.gumotexboats.com/en/revolution-in-the-field-of-drop-stitch-material-coating, accessed Aug. 25, 2021.
World Intellectual Property Organization, International Search Report and Written Opinion for International Application No. PCT/US2021/051527, mail date Dec. 28, 2021, 10 total pages.

* cited by examiner

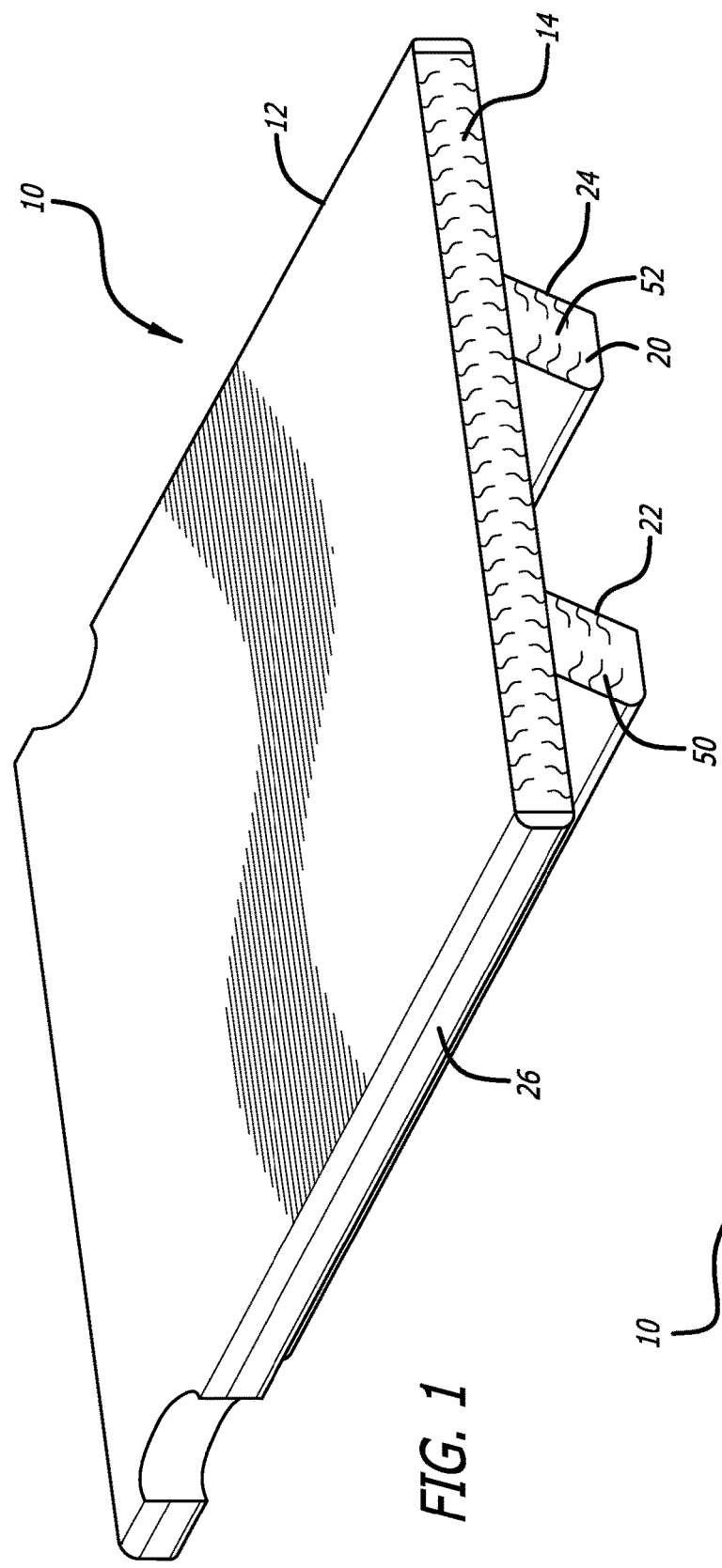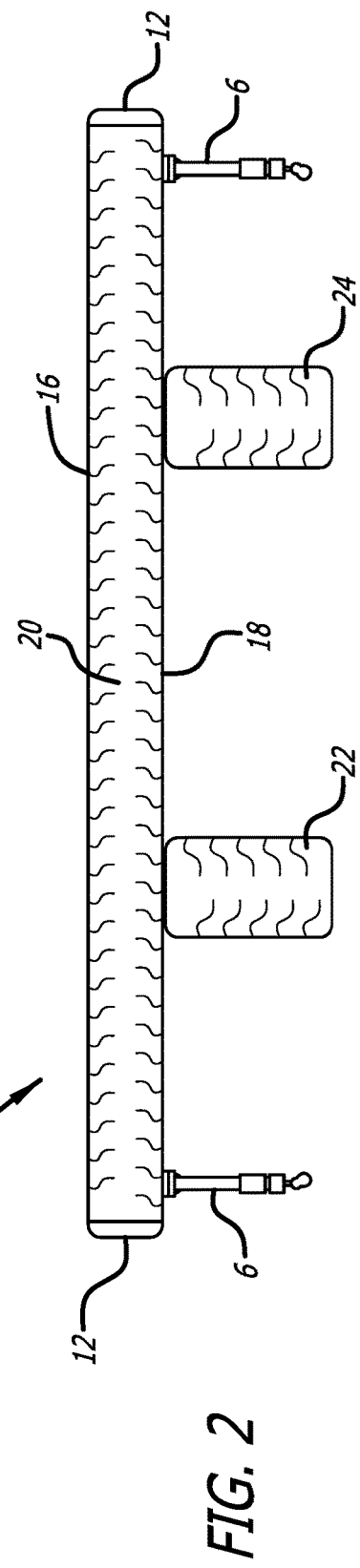
FIG. 1
FIG. 2

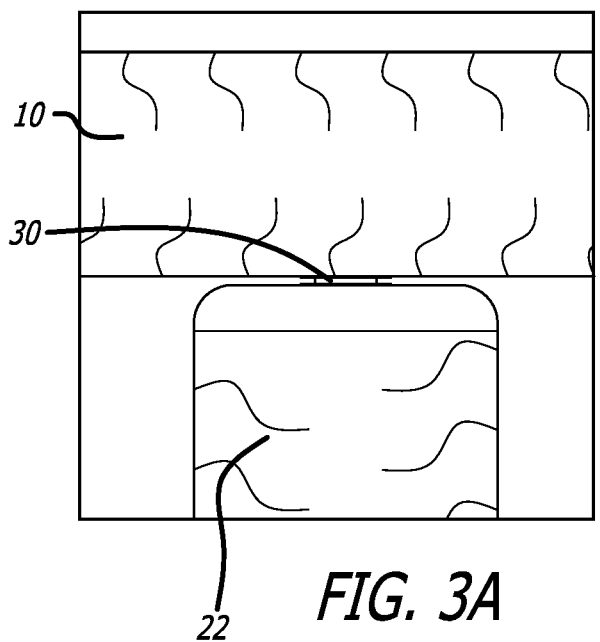
FIG. 3A
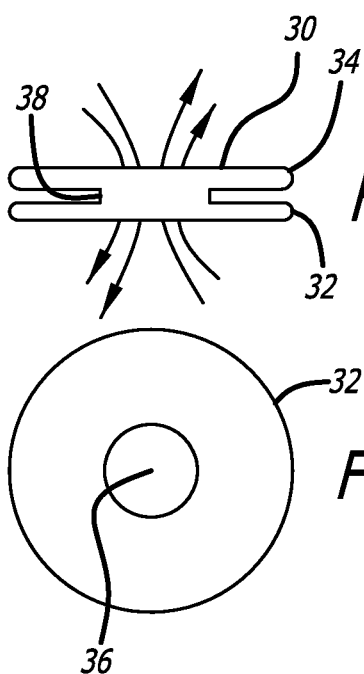
FIG. 3B
FIG. 3C
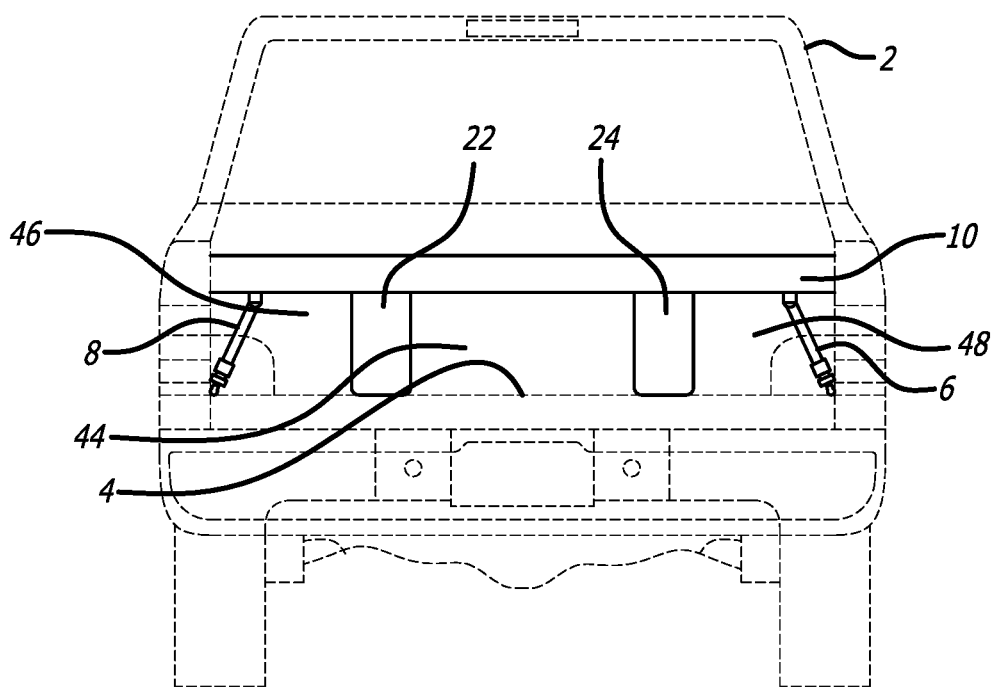
FIG. 4

INFLATABLE VEHICLE ACCESSORIES

RELATED APPLICATION INFORMATION

This patent is a continuation of U.S. patent application Ser. No. 17/481,901 filed Sep. 22, 2021 entitled "INFLATABLE VEHICLE ACCESSORIES", which claims priority to U.S. Provisional Application No. 63/081,526 filed Sep. 22, 2020 and U.S. Provisional Application No. 63/137,080 filed Jan. 13, 2021, all of which are incorporated in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

Vehicle accessories.

General Background and State of the Art

One class of vehicle accessories are those that attach to the outside of a vehicle, usually to the roof or a truck bed. One type, a vehicle cargo carrier, attaches to vehicles to allow people to carry luggage, skis, camping gear and other items. Some use them for travel to airports, train stations or cruise terminals when their vehicle trunk is not large enough to carry all needed luggage. Large carriers can hold over 20 ft$^3$ (≈0.57 m$^3$) (metric equivalents are approximated). Others may need one for camping trips to carry a tent and other camping gear.

Storage of a carrier can be an issue when the carrier is off the vehicle and not in use. Most are made of rigid plastic, fiberglass or metal, which retain their shapes when not in use and occupy space in the user's garage, shed or elsewhere.

Mounting a cargo carrier to the vehicle is another issue. Some vehicles especially SUVs have roof racks to support and secure loads. But many vehicles have no roof rack. Attaching a carrier to a roof without a rack is risky and potentially dangerous. Some people may try holding a carrier to the roof with ropes passing through the vehicle windows, but the load shifts easily, which can scratch the roof or even allow the carrier to fly off the roof especially at high speed.

Truck shells, which are also called truck caps and truck toppers, are another vehicle attachment. They commonly are rigid and rest on a truck bed. The portion above the bed may include flaps of canvas or similar materials to cover openings acting as windows to allow air into the truck shell. At least one opening may be large enough for a user to enter and exit the housing. The flaps may be closed or fully or partially opened with a zipper, Velcro®, magnets, or another fastener. The housing must be large enough to hold persons comfortably, but their large size also can create mounting and storage issues.

Though pickup truck beds can be wide, they are hard and some find sleeping difficult. Sleeping comfortably may be difficult if the bed is too narrow to accommodate all persons. By setting aside space for sleepers on the truck bed, items normally kept on the truck bed must be kept elsewhere.

SUMMARY

Instead of having rigid plastic, fiberglass or metal walls, which can be heavy and cumbersome, applicant's vehicle attachments use drop-stitch, inflatable walls. Drop-stitch material allows applicant's devices to inflate at high pressure and hold their forms. Tape such as PVC tape on the edges of the drop-stitch material cause the walls to be airtight at high pressures. This can form rigid structures. After use, a person can deflate the vehicle attachment through a high-pressure valve and roll or fold it so it can fit into a bag or other container that can be stored in small spaces and carried when needed. It also can be shipped easily, even as checked airplane luggage. The platform (and the other structures) can be inflated with manual or electric pumps.

The drop-stitch material allows the air to be removed so the entire structure can be rolled up for easier and smaller storage when not inflated or in use. When the inflatable structure is designed as a support, it is attached to a pickup truck bed with interior straps and magnetic flaps on the exterior of the structure. The structure also is waterproof. This can create a weatherproof seal between the structure and the body of the truck. By using drop-stitch material that is rigid when inflated, applicant's support is rigid enough to carry items on top of the vehicle, but it can be deflated and rolled and stored compactly.

Applicant's inflatable truck bed insert provides an easy-to-store, easy-to-ship, and easy-to-move inflatable rigid sleeping and storage platform that can be used in trucks, vans, SUVs and automobiles. Drop-stitch material, rigid when inflated, can make the platform stiff enough to support persons or cargo. Spaced-apart, elongated legs supports extending from the bottom of the platform raise the platform above the truck bed so the user can store items underneath the platform. Applicant's inflated raised platform keeps a sleeping person or pet off the ground or the truck bed unlike inflatable mattresses or sleeping bags on the ground or truck bed.

The inflatable raised platform makes space division in vehicles for different useful purposes.

Applicant's cargo carrier also is formed of inflatable drop-stitch material in a shape like hard carriers. The material is formed with a flat base for attaching to a vehicle. The top portion is spaced from the base. A rear wall connects the rear of top and base, and an angled, aerodynamic front wall connects the front of the top and base. The inside of the drop-stitch material of the base, rear wall, front wall and top portion connect to each other to balance the air pressure within the material. The cargo carrier may be formed of one piece of drop-stitch material that is bent to desired angles and connected together at one seam.

The cargo carrier also may have side walls of canvas or other flexible material to enclose the inside of the carrier. Harder material also may be used. Openings through the side walls can act as windows if a person sleeps in the carrier. The side walls also may be removed or opened to add or remove cargo from the carrier.

Instead of using the device as a carrier, it can be redesigned as an inflatable camper shell providing the space for sleeping, storage, or camping.

DESCRIPTION OF THE DRAWINGS

FIG. 1 is a is a perspective view of applicant's support.

FIG. 2 is an end view of applicant's support.

FIG. 3A is a sectional view of the top of applicant's support; FIG. 3B is a sectional view of the connection between the top and one leg of applicant's support within the circled area of FIG. 3B; and FIG. 3C is a top view of that connection.

FIG. 4 is a rear view of a truck in which applicant's support is mounted.

DETAILED DESCRIPTION

Figure 5:
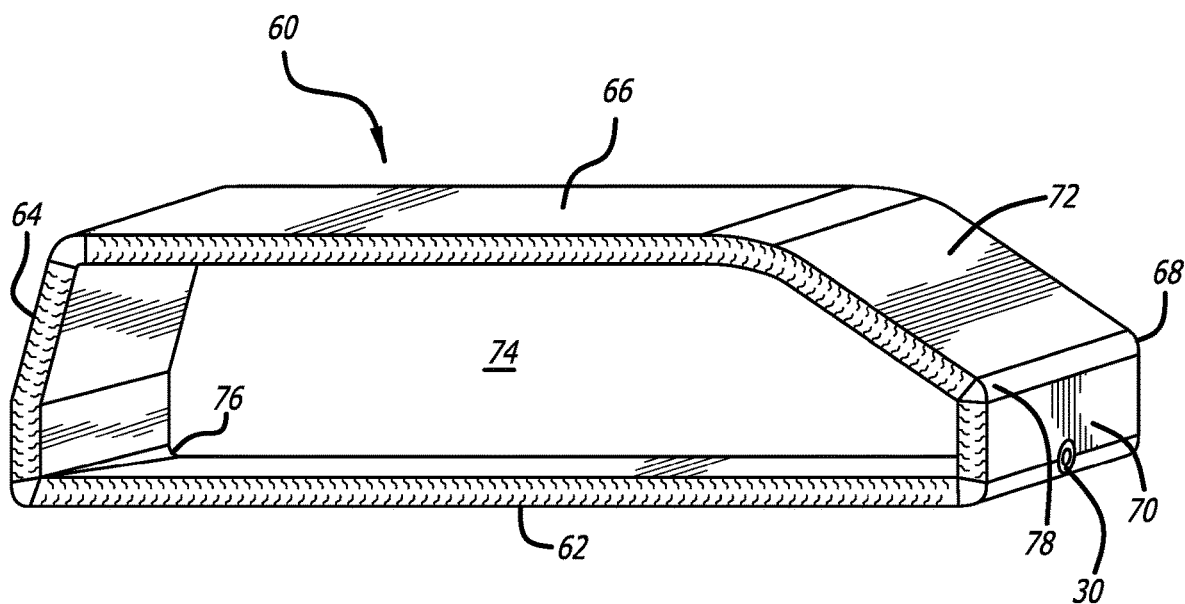
FIG. 5 is a side perspective of applicant's carrier.

The raised platform design: This design forms a platform made of drop-stitch material. The material joins two pieces of polyester woven support fabric with thousands of fine, flexible polyester threads 20 attaching the two pieces together into a strong unit.

An air-tight coating is applied to the outer surfaces of both sides of the material. The sidewalls of the panels are made of polyester base fabric coated on both sides. Polyester thread is used throughout because it is strong, durable and has little stretch. The resulting panels can be inflated to pressures of 20 psi ($\approx$138 kPa).

Platform 10 (FIGS. 1 and 2) has length sides 12 and width sides 14 forming top 16 and bottom 18. The platform is flat due to its inflated, drop-stitch fabric. The top surface may have a surface coating to resist the sun, avoid sipping or falls or for other reasons.

Valves 30 (FIGS. 3A-3C) connect platform 10 and legs 22 and 24. Each valve comprises a top and bottom flange 34 and 32 on ring 38. The ring has an opening through it. The valves attach to the bottom surface 18 of the platform and the top of the legs. When inflating platform 10 or a leg 22 or 24 through a valve (not shown), the valve allows the pressurized air to fill the platform and legs simultaneously. To deflate the platform, a user opens the valve, and the platform and legs deflate simultaneously.

Both figures also show legs 22 and 24 depending from the platform's bottom. The legs also are formed of drop-stitch material. PVC tape or tape another material seals the edges of the drop-stitch material so the platform and legs are airtight at high pressures.

The platform can mount on the bed 4 of a truck such as pickup truck 2 (FIG. 4). Tie-downs 6 secure the platform 10 to the truck bed 4, but the platform also can be removed from the truck and mounted on the ground or a building floor. Sidewalls 12 of platform 10 have indentations 40 and 42 to help grip the platform.

The platform in FIG. 4 extends to the truck's sidewalls 8, and the height of legs 22 and 24 position platform 10 at or near the top of the truck's sidewalls. Taller legs could mount the platform above the sidewall and the platform could be wider to extend beyond the sidewalls for a wider surface to accommodate more people or objects.

Elevating platform 10 provides a central storage space 44 and two side storage spaces 46 and 48 (FIG. 4) for objects such as camping equipment. Modifying the distance between legs 22 and 24 changes the sizes of the respective storage spaces.

Legs 22 and 24 extend most of the length of platform 10. They may have angled faces 50 and 52 (FIG. 1). The legs could be divided if desired.

The carrier design: Applicant also uses drop-stitch material for its carrier. Carrier 60 (FIGS. 5 and 6) comprises base 62, rear support 64, top 66 and a front section 68. The latter has a vertical section 70 and an angled section 72. FIG. 5 show the drop-stitch material inflated, which creates internal space 74.

Where the drop-stitch material changes direction such at the intersection of the base 72 and rear support 74, reinforcing tape 76 may be applied inside the carrier and at the outside 78 of the carrier. Valves like valves 30 in FIGS. 3A-3C may be at the intersections of base 62, rear support 64, top 66 and front section 68. The cargo carrier also may be one piece of drop-stitch material that is bent to the angle shown in the drawings.

Figure 6:
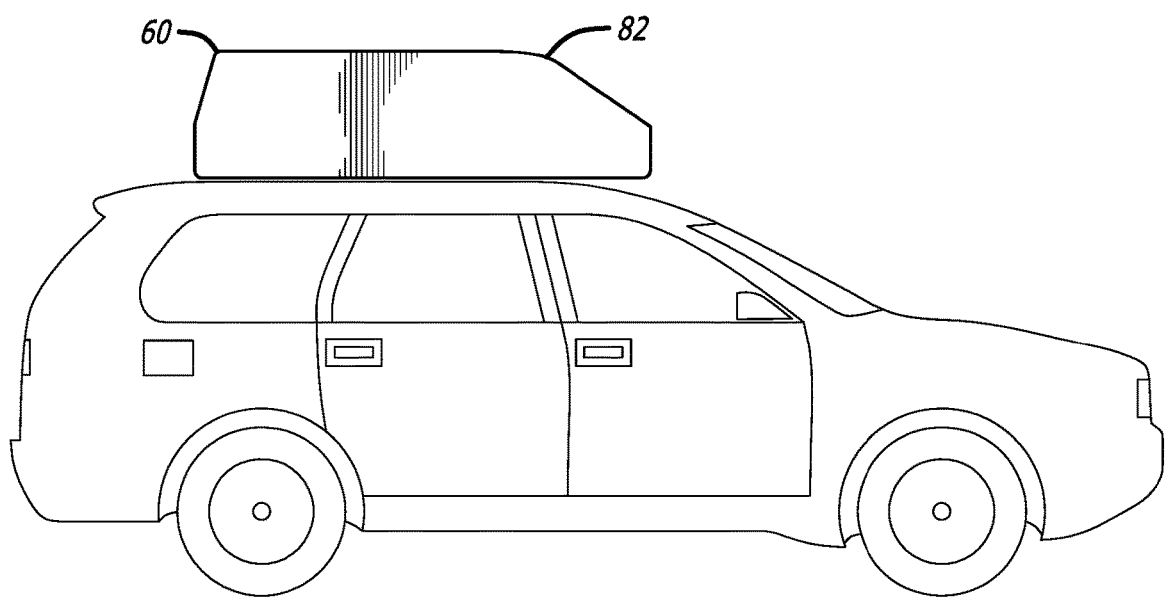
FIG. 6 is a side view showing applicant's carrier on a vehicle roof.
Figure 7:
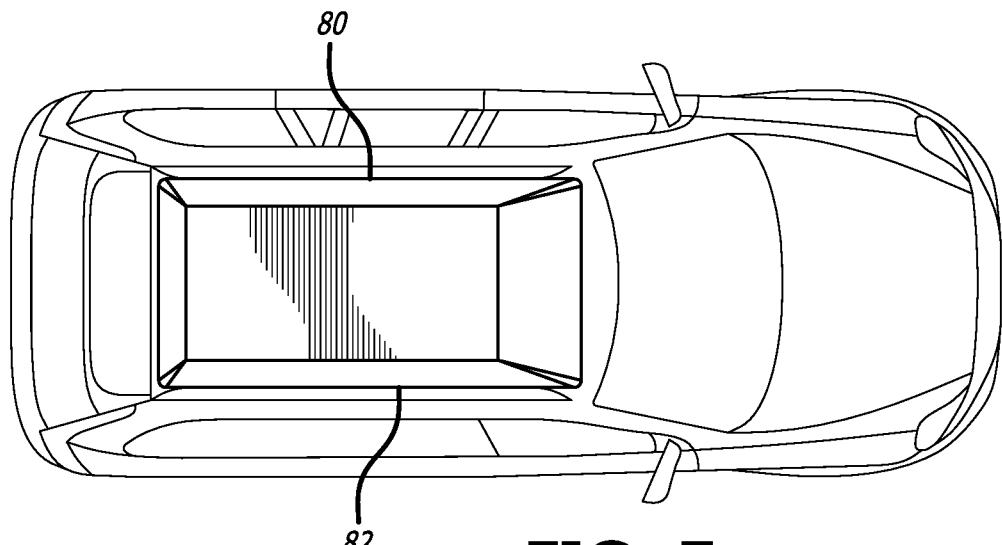
FIG. 7 is a plan view showing applicant's carrier on a vehicle roof.

Carrier 60 includes sides walls 80 and 82 (FIGS. 6, and 7). The walls may be made rigid by using inflatable drop-stitch material, or they may be made flexible by using materials such as canvas or plastic. FIG. 6 shows flexible side wall 82 partially attached to the carrier. A sidewall on the other side of the carrier is not shown in the drawing.

Fasteners such as clips, Velcro®, zippers, magnets or similar fasteners may connect to the sides of the carrier to side walls 80 and 82. Releasing fasteners allows access into the carrier for carrying luggage, camping equipment, surfboards, snowboards, skis, and other equipment.

The sidewalls 80 and 82 may have openings (not shown) to act as windows for ventilation. The "windows" may be transparent material to let outside light into the carrier. Depending on the carrier's length, persons may use it when empty to sleep. Any windows would allow ventilation for the sleeper.

Figure 8:
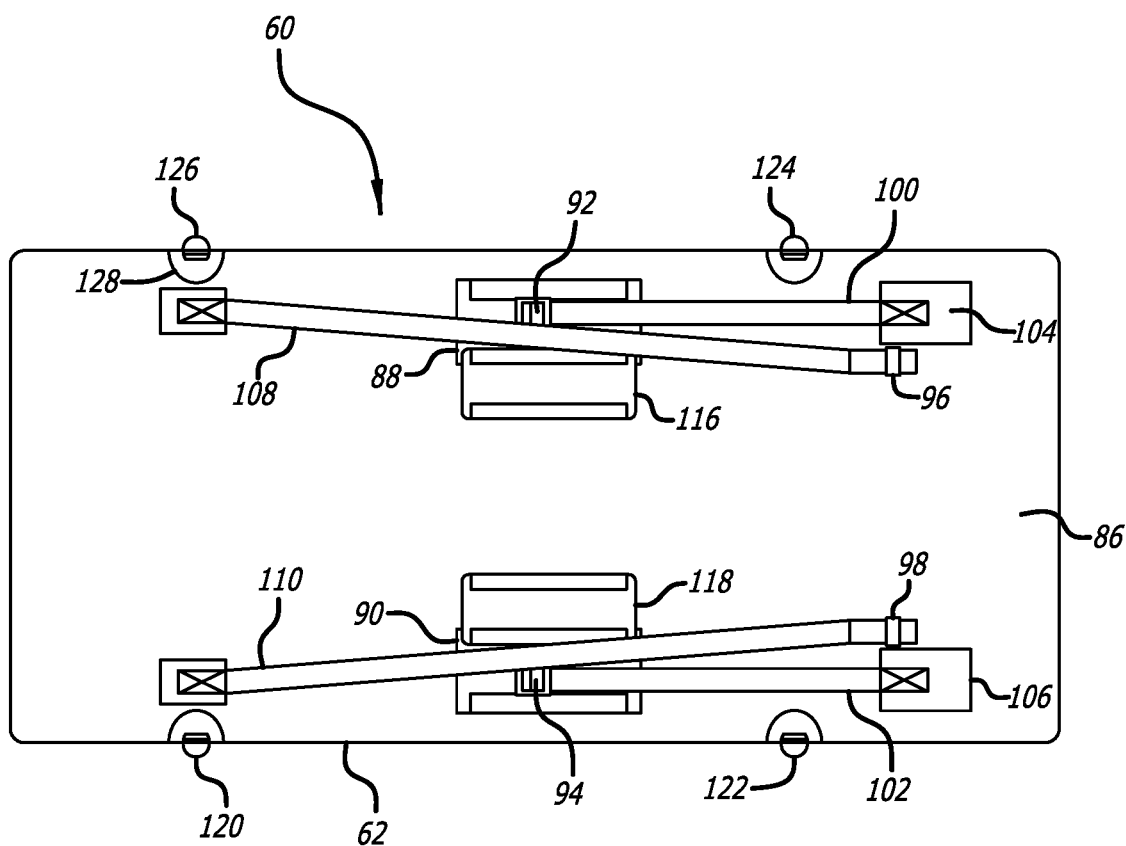
FIG. 8 is a is a bottom view of applicant's carrier.

Carrier 60 includes structure for attaching it to a vehicle roof. Bottom surface 86 of carrier base 62 includes housings 88 and 90 (FIG. 8). Each housing includes a strap clamp 92 and 94. Straps 100 and 102 extend from the respective strap clamp to a mounting bar that attaches to the vehicle roof at 104 and 106. Some vehicles have permanent mounting bars, but temporary bars are available to attach to a vehicle. A second set of straps 108 and 110 extend between the other mounting bars. Each strap 108 and 110 is tightened around the mounting bar on the right side of FIG. 8 where each can be tied off. Housings 88 and 90 have respective doors 116 and 118, which fold over the housing to protect clamps 92 and 94.

Clips such as D-rings 120, 122, 124 and 126 (FIG. 8) can mount on the outside of base 62. Short straps also may connect the D-rings to the vehicle. Adhesive pads such as pad 128 attach the D-rings to base 62.

The truck shell design: Applicant's device also may be constructed using drop-stitch material as a truck shell. Shell 140 (FIGS. 9, 10, 11 and 12) comprise front wall 142, two side walls 144 and 146 and an open rear 148. A door, which is flexible in FIG. 9 but may be rigid, covers the open rear. Fasteners attach door 152 to the rear of each sidewall.

Figure 10:
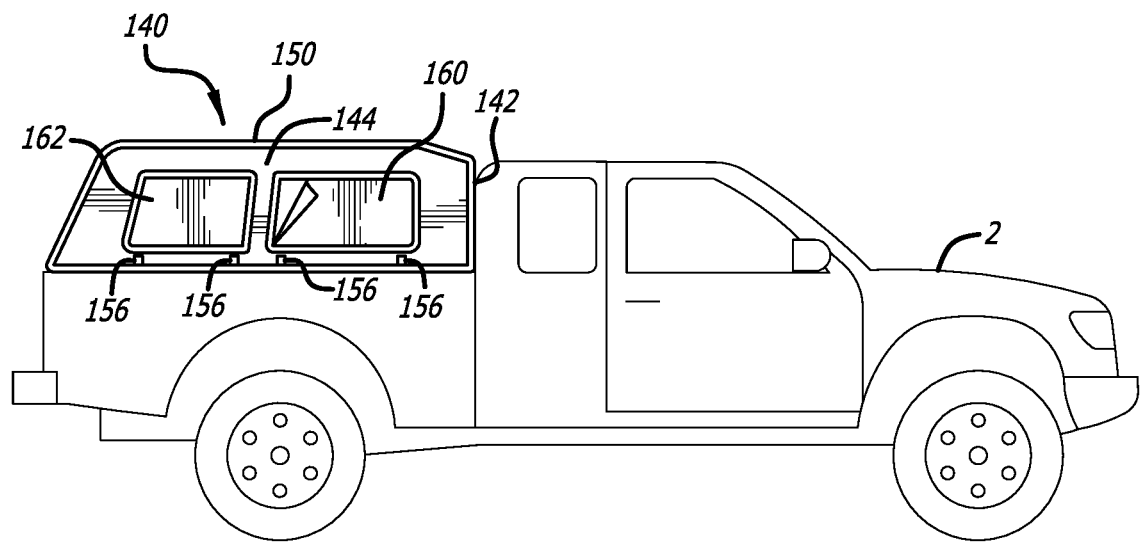
FIG. 10 is a side for of the truck shell mounted on a truck.

Clips 156 on straps 158 attach the shell to structure on truck 2 (FIG. 10). Top 150 of the truck shell attaches to the front wall 142 and sidewalls 144 and 146. The front wall may be curved (FIG. 11) to align with the truck's structure.

Figure 9:
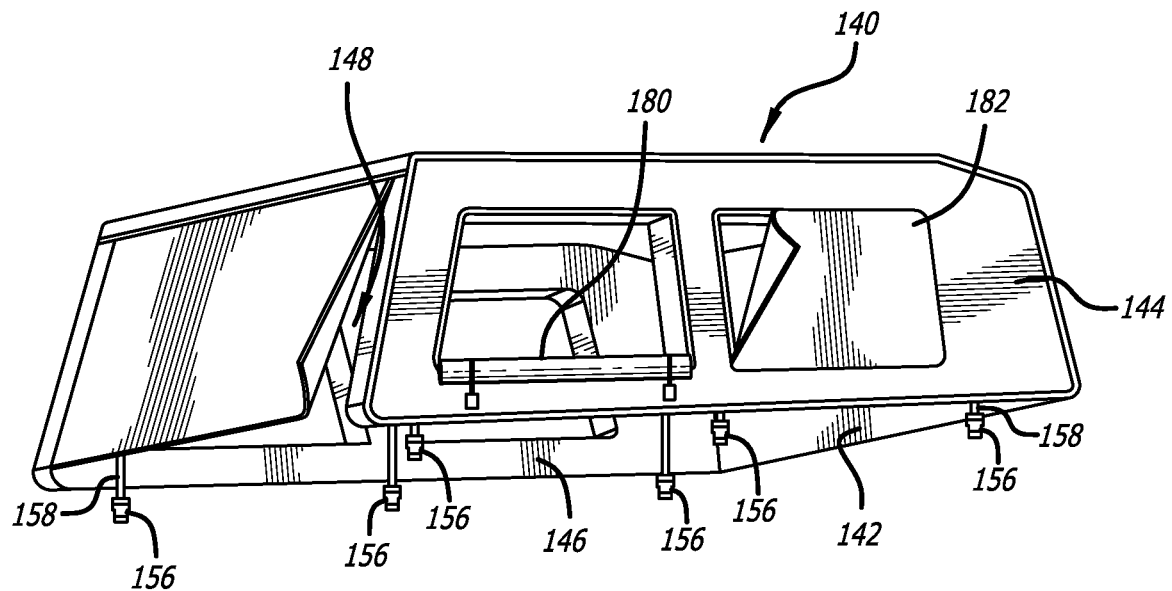
FIG. 9 is a perspective view of applicant's device used as a topper.
Figure 11:
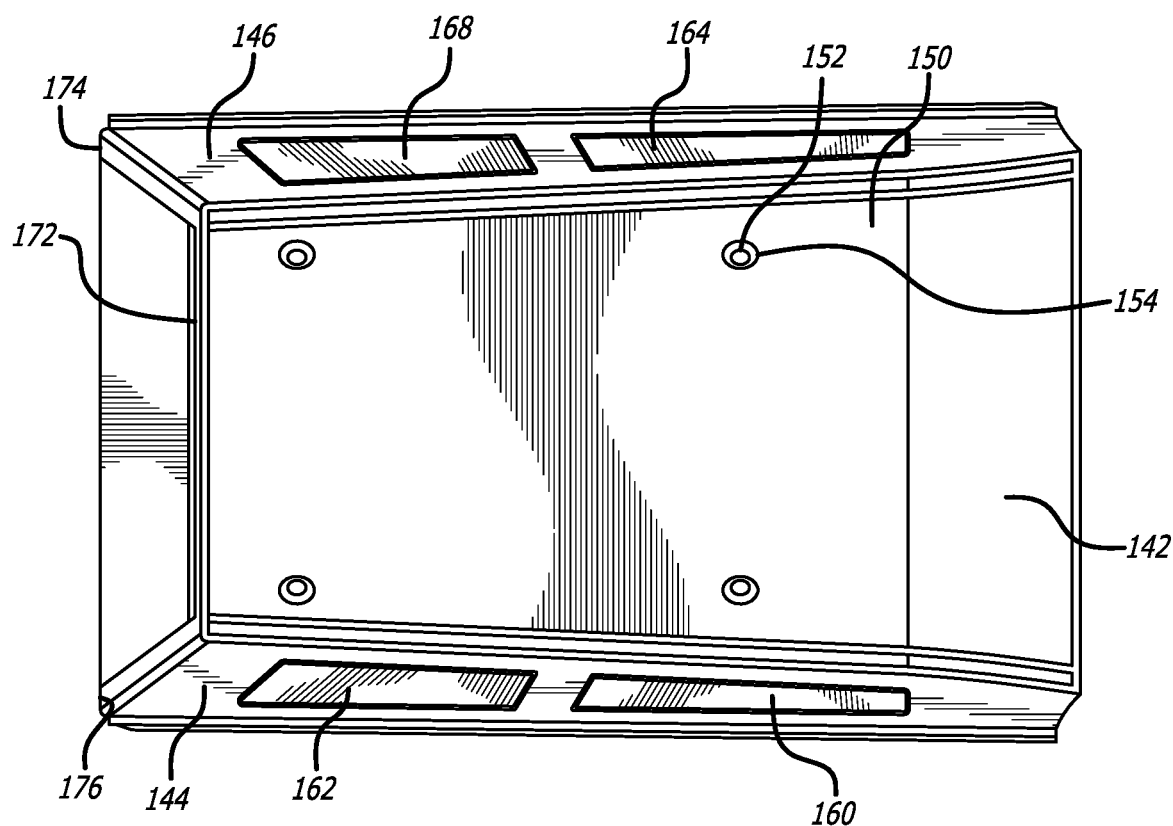
FIG. 11 is a plan view of the truck shell mounted.

Each sidewall 144 and 146 has window openings. FIGS. 9 and 11 show two on each side, 160, 162, 164 and 166. The windows may be covered with flexible material 180 and 182 (FIG. 9) of canvas, fabric or similar material. Material 180 is shown rolled up along the bottom of window 162. The top and side of the material can be secured to the top and sides of the window. Material 182 attaches to the perimeter of window 160 and a portion is shown unfastened. The inside of one or more windows can be transparent (not shown) so if material 180 or 182 is opened, outside light can illuminate the truck shell's inside while preventing rain or animals from entering the shell.

Figure 12:
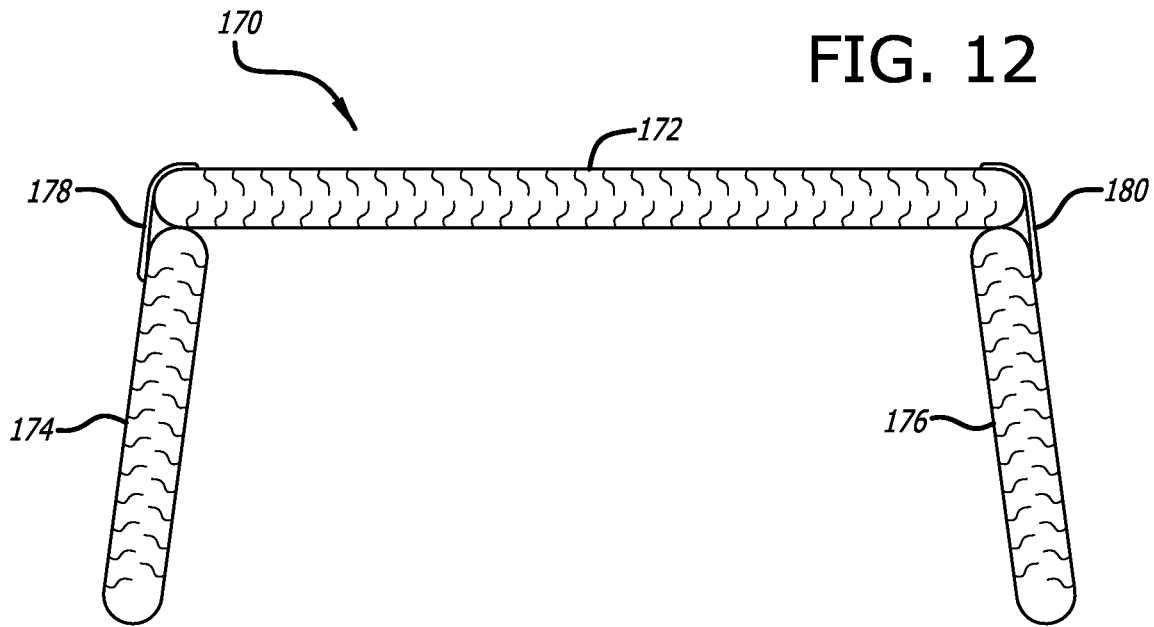
FIG. 12 is a rear end view of the truck shell.

Truck shell 140 may have no drop-stitch, rear wall; it is open to allow persons to enter or exit the shell. A rear wall of drop-stitch material with an opening through it is an option. For added support, a drop-stitch backing 170 may mount to the rear ends of top 150 and sidewalls 144 and 146 (FIGS. 11 and 12). FIG. 12 shows backing separately including it transverse section 172 and sides 174 and 176. Tape 178 and 180 may position the sides relative to the transverse section.

Material 178, which may be flexible or rigid covers the truck shell's rear opening 148 of truck shell 140 (FIGS. 9 and 12). Appropriate fasteners secure the material. When a person enters or exits the truck shell, the material is removed, opened to one side, or rolled up.

Top 150 of truck shell 140 may have rings such as ring 152 mounted on pad 154 (FIG. 11). The rings allow storage and conveyance on the shell's top of additional items such as camping gear and sporting equipment like surfboards. The truck shell normally is deflated during driving and should be small enough for the vehicle to carry.

The description is illustrative, not limiting and is for example only. Though this application shows and describes examples, those having ordinary skill in the art will find it apparent they can make changes, modifications or alterations. Many examples involve specific combinations of method acts or system elements, but those acts and those elements may be combined in other ways to achieve the same objectives. Acts, elements and features discussed only with one embodiment are not intended to be excluded from a similar role in other embodiments.

"Plurality" means two or more. A "set" of items may include one or more of such items. The terms "comprising," "including," "carrying," "having," "containing," "involving," and similar words in the written description or the claims are open-ended, i.e., each means, "including but not limited to." Only the transitional phrases "consisting of" and "consisting essentially of" are closed or semi-closed transitional phrases regarding claims. The ordinal terms like "first," "second," "third," etc., in the claims don't by themselves connote any priority, precedence, or order of one claim element over another or the temporal order in which acts of a method are performed. Instead, they merely are labels to distinguish one claim element having a certain name from another element having a same name (but for the ordinal term's use). Alternatives like "or" include one or any combination of the listed items.

It is claimed:

1. An inflatable truck shell device for mounting to a truck bed, comprising:
    a front wall having two sides, a sidewall attached to each of the two sides to form a first space, each sidewall having a rear end, and a shell top extending over the first space to the rear ends;
    an open rear between the rear end of each sidewall;
    at least one fastener on each sidewall for attaching the sidewalls to a truck;
    wherein the front wall and sidewalls are each formed of drop-stitch material; and
    wherein the first space has an open bottom for exposing the first space to the truck bed of the truck.

2. The inflatable device of claim 1, wherein tops of the sidewalls have a front end at the front wall, and wherein the front wall and the front ends are configured to be on the truck bed.

3. The inflatable device of claim 2, wherein the front wall and front ends are configured to be behind a cab of the truck.

4. The inflatable device of claim 2, wherein the at least one fastener includes clips and straps for attaching the sidewalls to sidewalls of the truck bed.

5. The inflatable device of claim 1, wherein the shell top is attached to tops of sidewalls and a top of the front wall.

6. The inflatable device of claim 1, further comprising PVC tape on the edges of the drop-stitch material wherein the PVC tape causes walls between the base and the shell top to be airtight at high pressures.

7. The inflatable device of claim 1. wherein the front wall and sidewalls form a continuous structure when inflated; and wherein the inflatable truck shell device is configured to be deflated so it can be put into a container.

8. The inflatable device of claim 1, wherein the drop-stitch material has an outer surface and a spaced inner surface connected by fine, flexible plastic thread and wherein the drop-stitch material form one connected piece with the space between the outer surface and inner surface being continuous so inflating at the front wall or sidewalls inflates the front wall and sidewalls.

9. The inflatable device of claim 1 further comprising a flap attached to the open rear for covering the open rear and at least one opening through at least one sidewall to allow access into the first space; wherein the flap is releasable from the open rear to provide access through the open rear.

10. An inflatable truck shell device for mounting on a truck, comprising:
    a front wall having two sides, a sidewall attached to each of the two sides to form a first space, each sidewall having a rear end, and a shell top extending over the first space to the rear ends;
    the shell top attached to a top of the front wall and tops of the two sidewalls;
    an open rear between the rear end of each sidewall;
    at least one fastener on each sidewall for attaching the sidewalls to the truck;
    wherein the front wall and sidewalls are each formed of drop-stitch material; and
    wherein the first space has an open bottom for exposing the first space to a bed of the truck.

11. The inflatable device of claim 10, wherein the tops of the sidewalls have a front end at the front wall, and wherein the front wall and front ends are configured to be on the truck bed.

12. The inflatable device of claim 11, wherein the front wall and front ends are configured to be behind a cab of the truck.

13. The inflatable device of claim 11, wherein the at least one fastener includes clips and straps for attaching the sidewalls to sidewalls of the truck bed.

14. The inflatable device of claim 10, further comprising PVC tape on the edges of the drop-stitch material wherein the PVC tape causes walls between the base and the top to be airtight at high pressures.

15. The inflatable device of claim 10, wherein the front wall and sidewalls form a continuous structure when inflated; and wherein the inflatable truck shell device is configured to be deflated so it can be put into a container.

16. The inflatable device of claim 10, further comprising at least one opening through at least one sidewall to allow access into the first space.

17. An inflatable truck shell device for mounting to a truck bed, comprising:
- a front wall having two sides, a sidewall attached to each of the two sides to form a first space, each sidewall having a rear end, and a shell top extending over the first space to the rear ends;
- at least one opening through at least one sidewall to allow access into the first space;
- an open rear between the rear end of each sidewall;
- at least one fastener on each sidewall for attaching the sidewalls to a truck;
- wherein the front wall and front ends are configured to be behind a cab of the truck;
- wherein tops of the sidewalls have a front end at the front wall, and wherein the front wall and the front ends are configured to be on the truck bed;
- wherein the front wall and sidewalls are each formed of drop-stitch material; and
- wherein the first space has an open bottom for exposing the first space to the truck bed of the truck.

18. The inflatable device of claim 17, wherein the front wall is curved to align with a back of the cab of the truck.

19. The inflatable device of claim 17, wherein the front wall and sidewalls form a continuous structure when inflated; and wherein the inflatable truck shell device is configured to be deflated, and rolled or folded, so it can be put into another container.

* * * * *